United States Patent
Wang et al.

(10) Patent No.: US 11,119,876 B2
(45) Date of Patent: Sep. 14, 2021

(54) DEVICE AND METHOD FOR TESTING COMPUTER SYSTEM

(71) Applicant: SUPER MICRO COMPUTER, INC., San Jose, CA (US)

(72) Inventors: Mao Sui Wang, San Jose, CA (US); Pao-Ting An, New Taipei (TW)

(73) Assignee: SUPER MICRO COMPUTER, INC., San Jose, CA (US)

( * ) Notice: Subject to any disclaimer, the term of this patent is extended or adjusted under 35 U.S.C. 154(b) by 212 days.

(21) Appl. No.: 16/155,507

(22) Filed: Oct. 9, 2018

(65) Prior Publication Data

US 2020/0110683 A1 Apr. 9, 2020

(51) Int. Cl.
*G06F 11/00* (2006.01)
*G06F 11/273* (2006.01)
*G06F 11/22* (2006.01)

(52) U.S. Cl.
CPC ........ *G06F 11/273* (2013.01); *G06F 11/2247* (2013.01)

(58) Field of Classification Search
CPC .... G06F 11/273; G06F 11/2247; G06F 11/27; G06F 11/2733; G06F 11/3065; G06F 11/3089
See application file for complete search history.

(56) References Cited

U.S. PATENT DOCUMENTS

| | | | | |
|---|---|---|---|---|
| 6,029,257 | A * | 2/2000 | Palmer | G06F 11/273 714/25 |
| 7,235,999 | B2 * | 6/2007 | Goetting | G01R 31/3167 326/14 |
| 7,725,742 | B2 * | 5/2010 | Hirai | G06F 1/26 713/300 |
| 9,798,625 | B2 * | 10/2017 | Teshome | G06F 11/1417 |
| 2005/0283553 | A1 * | 12/2005 | Droba | G06F 9/4825 710/200 |
| 2007/0079162 | A1 * | 4/2007 | Mundada | G06F 1/26 713/330 |
| 2008/0270079 | A1 * | 10/2008 | Delory | G06F 11/273 702/186 |
| 2015/0127983 | A1 * | 5/2015 | Trobough | G06F 11/267 714/30 |
| 2017/0111215 | A1 * | 4/2017 | Chou | G06F 11/0766 |

OTHER PUBLICATIONS

Altera Corporation. (2009). "Six Ways to Replace a Microcontroller With a CPLD" [White paper]. https://www.intel.com/content/dam/www/programmable/us/en/pdfs/literature/wp/wp-01041-six-ways-to-replace-microcontroller-with-cpld.pdf (Year: 2009).*

* cited by examiner

*Primary Examiner* — Anthony J Amoroso
(74) *Attorney, Agent, or Firm* — WPAT, P.C.; Anthony King

(57) ABSTRACT

A computer system includes a circuit board, one or more connectors/sockets and a first controller. The connectors/sockets are disposed on the circuit board. The first controller is configured to receive information corresponding to parameters of the circuit board and/or the connectors/sockets before booting up the computer system to run an operating system (OS).

22 Claims, 2 Drawing Sheets

DEVICE AND METHOD FOR TESTING COMPUTER SYSTEM

BACKGROUND

1. Technical Field

The subject application relates to a device and a method of performing a test on a computer system.

2. Description of the Related Art

To ensure a stable and normal operation of a computer system (e.g., a server, a personal computer, a laptop, a mobile computing device, etc.), some tests are performed on the computer system.

An in-circuit test (ICT) technique may be used to test the computer system, which requires an extra mechanism (e.g., a vacuum) to fix a device (e.g. the computer system) under test (DUT), which increases manufacturing cost.

An intelligent platform management interface (IPMI) software was developed to cut the cost. The IPMI software may be implemented to test the computer system. However, the IPMI test is not initiated until the computer system is booted up (e.g., an operating system (OS) is loaded in the computer system), which means the IMPI test has to wait before the OS is loaded. In addition to the aforesaid time inefficiency, defect(s) existed in the computer system cannot be detected until the computer system is operated at the OS stage. In other words, such defect(s) may not be timely fixed and may cause systematic problem(s) (e.g. failure of boot-up of the computer system)

Moreover, the IPMI test has a relatively low sampling rate for an analog-to-digital converter (ADC) in the computer system, which may adversely affect test results.

Furthermore, since the existing approaches for testing the computer system can only be performed when the computer system is operated at the OS stage, some of the information or parameters of the computer system may not be fully tested.

SUMMARY

In accordance with some embodiments of the subject application, a computer system includes a circuit board, one or more connectors/sockets and a first controller. The connectors/sockets are disposed on the circuit board. The first controller is configured to receive information corresponding to parameters of the circuit board and/or the connectors/sockets before booting up the computer system to run an operating system (OS).

In accordance with some embodiments of the subject application, a computer system includes a circuit board, one or more components and a first controller. The components are disposed on the circuit board. The first controller is configured to receive information corresponding to parameters of the circuit board and/or the components before booting up the computer system to run an operating system (OS).

In accordance with some embodiments of the subject application, a method for testing a computer system includes (a) providing a direct current (DC) power to turn on the computer system; (b) detecting parameters of components of the computer system; and (c) collecting information corresponding to the detected parameters of the components of the computer system before booting up the computer system to run an operating system (OS)

Figure 1:
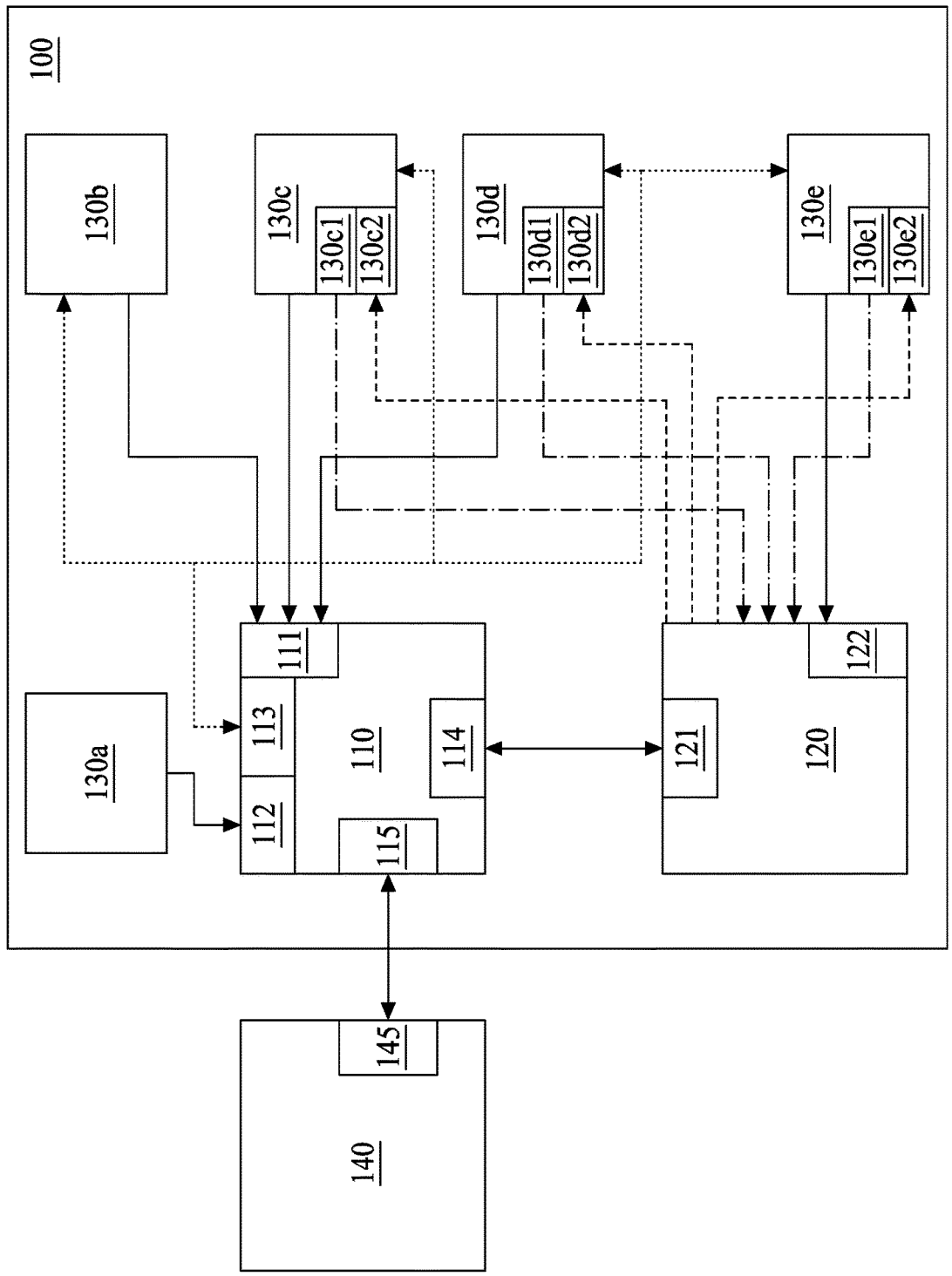
FIG. 1 illustrates a system for testing a device under test in accordance with some embodiments of the subject application.

Common reference numerals are used throughout the drawings and the detailed description to indicate the same or similar components. The subject application will be more apparent from the following detailed description taken in conjunction with the accompanying drawings.

DETAILED DESCRIPTION

FIG. 1 illustrates a system for testing a device under test (DUT) 100 in accordance with some embodiments of the subject application. The DUT 100 may include but is not limited to, for example, a computer system (e.g., a server, a data center which includes a number of servers, a personal computer, a laptop, a mobile computing device, etc.) or a part of the computer system. The DUT 100 has a baseboard management controller (BMC) 110, a complex programmable logic device (CPLD) 120 (or a field programmable gate array, FPGA), and controllers 130a, 130b, 130c, 130d and 130e.

Each of the controllers 130a, 130b, 130c, 130d and 130e may be connected to a respective component(s) (e.g. electronic component) in the computer system. For example, each of the controllers 130a, 130b, 130c, 130d and 130e may be connected to a processor, a memory, a chipset, a main storage device and/or other component(s) resided in the computer system 100. Each of the controllers 130a, 130b, 130c, 130d and 130e may be connected to one or more component(s) in the computer system. One of more controllers 130a, 130b, 130c, 130d and 130e may be connected to a component in the computer system.

The controllers 130a, 130b, 130c, 130d and 130e may include different types of sensors to obtain parameters or information of the components and to transmit the parameters or information to the BMC 110. The parameters or information may include the temperature of a component in the computer system, speed of a component (e.g., a fan) in the computer system, an electrical signal (e.g. an alternating current/direct current (AC/DC) input/output voltage or a power status of a component in the computer system, a status of an operating system (OS) status, timing, digital input signals (e.g., information of Voltage Regulator-Down (VRD), such as "power good" information) or the like.

In some embodiments, the controller 130a may include a fan speed controller configured to collect or detect information or data corresponding to the fan speed and to send or transmit the collected information or data to the BMC 110.

In some embodiments, the controller 130b may include a temperature sensor (or controller) configured to collect or detect information or data corresponding to the temperature of the components within the computer system and to send or transmit the collected information or data to the BMC 110.

In some embodiments, the controllers 130c, 130d and 130e may include voltage regulators configured to collect or detect information or data corresponding to voltages (e.g., direct current (DC) voltage) applied to the components within the computer system and to send or transmit the collected information or data to the BMC 110.

In some embodiments, the controllers 130c, 130d and 130e are configured to receive signal (e.g., enable signal) from the CPLD 120 through pins 130c2, 130d2 and 130e2 (e.g., "EN" pins) to start detecting or collecting information or data corresponding to the voltages applied to the components within the computer system. The controllers 130c, 130d and 130e are configured to send the detected results to the CPLD 120 through, for example, pins 130c1, 130d1 and 130e1 (e.g., "PG" pins). The results sent to the CPLD 120 from the controllers 130c, 130d and 130e may include a signal (e.g., a power good signal) indicating whether a voltage has been applied to a component and/or a signal indicating a sequence or timing of the voltage applied to the component. The number or types of the controllers can be changed in the computer system 100 of interest.

The BMC 110 is configured to manage interfaces between the system management software and the platform hardware. The BMC 110 may include but is not limited to, for example, a processor, a memory and I/O devices. The BMC 110 can be booted up once the computer system is powered (e.g., being supplied by alternative current (AC) power). For example, the BMC 110 can be booted up without turning on the computer system (e.g., being supplied by DC power). The BMC 110 may function as a microcontroller to monitor or manage the parameters of the components resided in the computer system. The BMC 110 is electrically connected to each of the controllers 130a, 130b, 130c, 130d and 130e to receive the detected parameters or information. The BMC 110 may be connected to each of the controllers 130a, 130b, 130c, 130d and 130e through a SMBus, an RS-232 serial console, an address and data line, an Intelligent Platform Management Bus (IPMB), PCI-Express (PCI-E) or the like.

The BMC 110 may include an analog-to-digital converter (ADC) 111 configured to receive information or data corresponding to detected voltages from the controllers 130b, 130c, 130d. The BMC 110 may include a tachometer 112 configured to receive information or data corresponding to the fan speed from the controller 130a. The BMC 110 may include an inter-integrated circuit (I$^2$C) 113 configured to receive information or data corresponding to temperatures of the components of the computer system from the controllers 130b, 130c, 130d. The BMC 110 may include another I$^2$C 114 connected to the I$^2$C 121 of the CPLE 120 to receive signal or data from the CPLD 120.

In some embodiments, the BMC 110 can detect the information, data or parameters of the components within the computer system after the computer system is powered on and before the computer system has been booted up (e.g. an operating system (OS) is loaded). In other words, the BMC 110 can detect the information, data or parameters of the components within the computer system before the computer system is operated at an operating system (OS) stage. For example, the BMC 110 can detect the information, data or parameters of the components within the computer system at u-boot stage.

As compared to some approaches, which detect the information, data or parameters of the components after the computer system has been booted up (e.g., at the OS stage), performing a test at the u-boot stage can save the time of loading the OS. In addition, performing a test at u-boot stage can obtain parameters of the components at a relatively early stage (e.g. an initial state) may timely detect and fix defect(s), as compared to some approaches that perform a test at a relatively late stage (e.g. at a stable state). In other words, errors or issues existed prior to an OS stage can be detected at u-boot stage. Mechanism (e.g., a vacuum) to fix the computer system 100 may be eliminated in such approach, and thus the cost is reduced.

The information, data or parameters of the components within the computer system detected by the BMC 110 can be transmitted to a remote server 140 through a wired or wireless communication (e.g., e.g., local area network, LAN). In some embodiments, test on the computer system can be initiated or activated by the remote server 140.

The CPLD 120 is electrically connected to the BMC 110. The CPLD 120 is electrically connected to one of more of the controllers 130a, 130b, 130c, 130d and 130e. The CPLD 120 receives the data or information from one of more of the controllers 130a, 130b, 130c, 130d and 130e and transmits the data or information to the BMC 110.

In some embodiments, the number of voltage levels that can be received by the ADC 111 of the BMC 110 is limited. The CPLD 120 includes one or more analog-to-digital converters (ADC) 122 which are capable of supporting more inputs of power rails to receive more voltage levels in addition to the voltages received by the ADC 111 of the BMC 110. For example, if the maximum number of the voltages that can be received by the ADC 111 of the BMC 110 is 16, the CPLD 120 can be configured to receive more voltages than 16 voltages received by the ADC 111 of the BMC 110. The information or data corresponding to the voltages received by the ADC 122 of the CPLD 120 can be transmitted to the BMC 110 through the I$^2$C 121 and 114 of the CPLD 120 and the BMC 110, respectively. By introducing one or more ADC(s) 122 into the CPLD 120, more voltages can be detected.

In some embodiments, the CPLD 120 can be configured to transmit signal to the controllers 130c, 130d and 130e and to receive information or data corresponding to the status, timing or sequence of the voltages detected by the controllers 130c, 130d and 130e (e.g., voltage regulators). For example, the CPLD 120 is configured to send enable signal to the controllers 130c, 130d and 130e to enable the controllers 130c, 130d and 130e to start detecting or collecting information or data corresponding to the voltages applied to the components within the computer system. The CPLD 120 is also configured to receive signal from the controllers 130c, 130d and 130e indicating whether the voltages have been applied to the components successfully and/or the sequence or timing of the voltages applied to the components.

Figure 2:
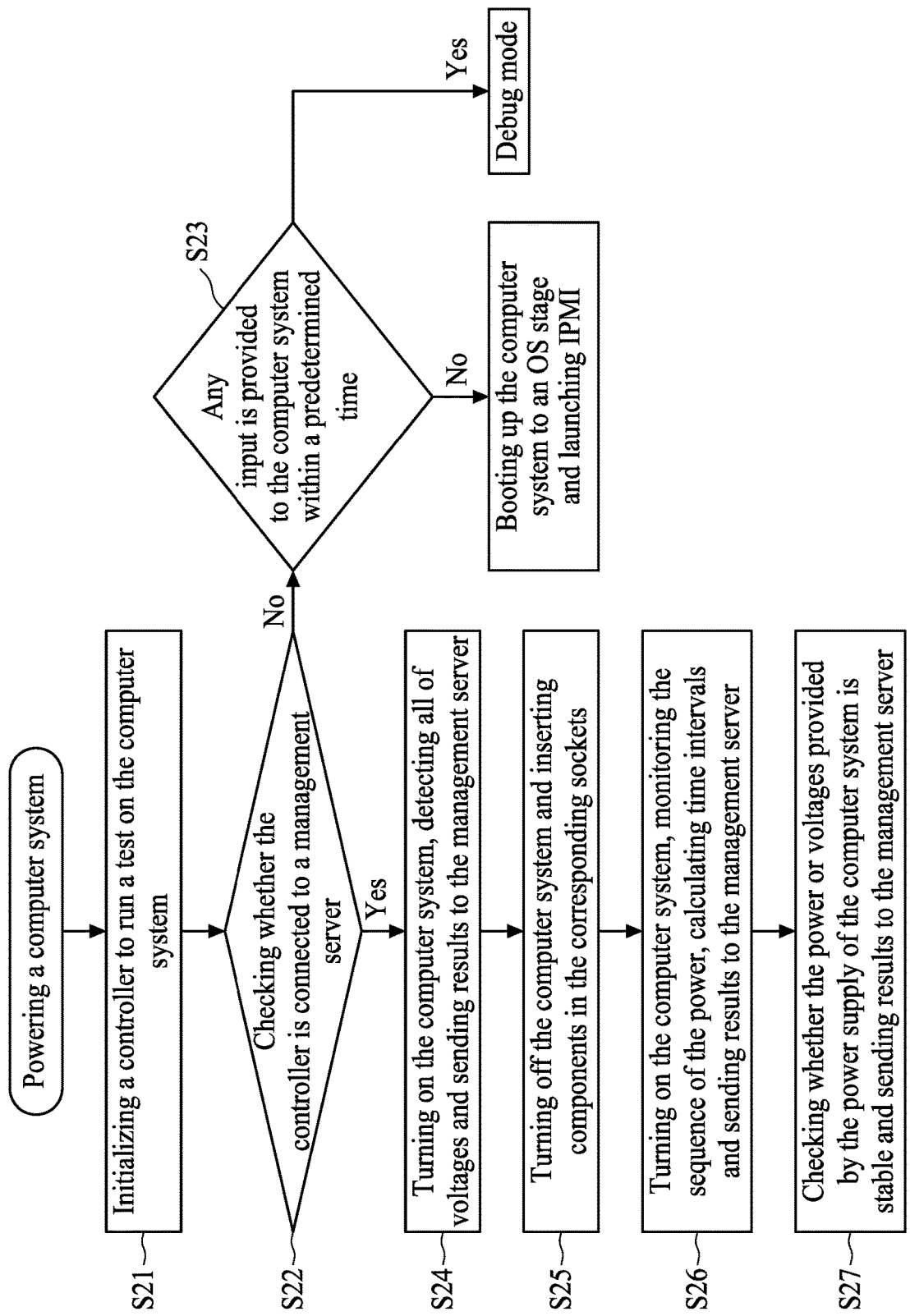
FIG. 2 illustrates a method of performing a test on a computer system in accordance with some embodiments of the subject application.

FIG. 2 illustrates a method for performing a test on a computer system in accordance with some embodiments of the subject application. For example, the method illustrated in FIG. 2 may be used to test the computer system as shown in FIG. 1.

Referring to operation S21, after the computer system is powered (e.g., being supplied with AC power), a controller (e.g. a BMC or any other suitable controller) is initialized to, for example but is not limited to, running a test on a computer system (e.g. monitoring or obtaining parameters of components in the computer system). In some embodiments, the processor (e.g., CPU), a memory and I/O devices of the BMC are initialized.

Referring to operation S22, whether or not the BMC is connected to a server (e.g. a management server or a remote server) is determined. The BMC may be connected to the server through a wired or wireless communication.

Referring to operation S23, if the BMC is determined to be disconnected from any management server, the controller may determine whether any input signal (e.g., input signal received from a human interface device (HID) or other signal receiving device) is provided to the computer system within a predetermined time (e.g., 3 seconds). If so, the computer system may enter a debug mode (e.g., the u-boot command prompt is shown). If not, the computer system continues booting up to load an OS (e.g. Linux, iOS, Windows or the like), and then an intelligent platform management interface (IPMI) test may be launched.

Referring to operation S24, if the BMC is determined to be connected to a server, the BMC is configured to turn on the computer system (e.g., providing DC power to the computer system). The BMC is then configured to receive, from an ADC of the BMC, voltages or information corresponding to voltages applied to sockets (or connectors) of a circuit board (e.g., motherboard or printed circuit board (PCB)).

In some embodiments, if the number of the voltages to be received by the ADC of the BMC reach a maximum number, a CPLD is configured to receive the other voltages and to transmit voltages or information corresponding to the voltages to the BMC through, for example, $I^2C$. The BMC is then configured to transmit or send received information or data to the management server via wired or wireless communications (e.g., LAN).

Referring to operation S25, the computer system is turned off and then the components are inserted in the corresponding sockets, respectively.

Referring to operation S26, after all the components have been inserted in the corresponding sockets, the computer system is turned on. The sequence of power or voltages supplied to the components is checked or monitored and the timing intervals combined with power rails are calculated. In some embodiments, the sequence for applying voltages to the components is determined based on enable signal provided by the CPLD. The BMC is then configured to transmit or send received information or data to the management server via wired or wireless communications. If any error or failure occurs, a failure analysis and/or intelligent debugging will be carried on by, for example, the management server.

In some embodiments, the operations S24 and S25 can be omitted. For example, if the components have been inserted in the corresponding sockets, the BMC can be configured to detect the parameters of the components directly.

Referring to operation S27, the BMC is synchronized with BIOS of the computer system to run a power thermal utility (PTU) test. For example, a large power or voltage is applied to CPU of the computer system to check whether the power provided by a power supply is stable. In addition, a stress test may be performed on the memory, GPU or any other components of the computer system. For example, a large power or voltage is applied to the component of the computer system under the stress test to check whether the power provided by the power supply is stable. Then, the BMC is configured to read current from the power supply to obtain testing results and to send received information or data to the management server via wired or wireless communications. In some embodiments, the ripple and/or efficiency of the power supply can be analyzed by, for example, the management server.

In some embodiments, the parameters including temperature of the components in the computer system and speed of rotational components (e.g., fan speeds) in the computer system can be also detected or obtained at operation S24 and/or operation S26.

In some embodiments, the operations S21 to S27 can be performed after the computer system is powered on and before the computer system has been completely booted up. In other words, the operations S21 to S27 can be performed before the computer system is operated at the operating system (OS) stage. For example, the operations S21 to S27 can be performed at the u-boot stage. As mentioned above, compared to some approaches, which detect the information, data or parameters of the components after the computer system has been booted up (e.g., at the OS stage), the time for performing tests at the u-boot stage can be significantly reduced. In addition, performing tests at u-boot stage can obtain parameters of the components at an initial state, which might be different from the parameters of the components at a stable state. Therefore, some errors or abnormal parameters that cannot be found when the computer system is operated at the OS stage can be detected by performing tests at u-boot stage.

While the subject application has been described and illustrated with reference to specific embodiments thereof, these descriptions and illustrations do not limit the subject application. It can be clearly understood by those skilled in the art that various changes may be made, and equivalent elements may be substituted within the embodiments without departing from the true spirit and scope of the subject application as defined by the appended claims. The illustrations may not necessarily be drawn to scale. There may be distinctions between the artistic renditions in the subject application and the actual apparatus, due to variables in manufacturing processes and such. There may be other embodiments of the subject application which are not specifically illustrated. The specification and drawings are to be regarded as illustrative rather than restrictive. Modifications may be made to adapt a particular situation, material, composition of matter, method, or process to the objective, spirit and scope of the subject application. All such modifications are intended to be within the scope of the claims appended hereto. While the methods disclosed herein have been described with reference to particular operations performed in a particular order, it can be understood that these operations may be combined, sub-divided, or re-ordered to form an equivalent method without departing from the teachings of the subject application. Therefore, unless specifically indicated herein, the order and grouping of the operations are not limitations of the subject application.

What is claimed is:

1. A computer system, comprising:
   a circuit board;
   one or more connectors/sockets disposed on the circuit board;
   one or more components disposed in the corresponding connectors/sockets;
   a first controller that is on the circuit board and configured to, before booting up the computer system to run an operating system (OS):
      receive information corresponding to parameters of the components and the circuit board and/or the connectors/sockets;
      determine whether the first controller is connected to a server; and
      determine, in response to a determination that the first controller is not connected to a server, whether an input signal is provided to the computer system within a predetermined amount of time; and
   a complex programmable logic device (CPLD) that is on the circuit board and configured to, before booting up the computer system to run the OS:
      provide a first signal to enable at least some of the components;
      receive information corresponding to a sequence of voltages applied to the enabled components; and transmit the received information to the first controller;
wherein the first controller is a baseboard management controller (BMC) and includes a first analog-to-digital converter (ADC) configured to receive information corresponding to voltages applied to a first set of components; and
wherein the CPLD includes a second ADC configured to receive information corresponding to voltages applied to a second set of components, wherein the second ADC is capable of receiving more voltage levels than the first ADC.

2. The computer system of claim 1, wherein the parameters include a temperature of the components in the computer system, a speed of rotational components in the computer system, alternating current/direct current (AC/DC) voltages or power status of the components in the computer system, OS status, timing and/or digital input signals.

3. The computer system of claim 1, further comprising a plurality of controllers connected to the first controller and the components, wherein the controllers are configured to detect information corresponding to parameters of the components, the circuit board and/or the connectors/sockets, and to transmit detected information to the first controller.

4. The computer system of claim 1, wherein the first controller is configured to transmit the received information to a management server.

5. The computer system of claim 1, wherein the first controller is configured to receive the information at a u-boot stage.

6. The computer system of claim 1, wherein the sequence of applied voltages is checked or monitored.

7. The computer system of claim 6, wherein timing intervals of the applied voltages are calculated combined with power rails.

8. The computer system of claim 6, wherein the sequence for applying the voltages to the enabled components is determined based on the first signal provided by the CPLD.

9. The computer system of claim 6, wherein the CPLD is configured to, before booting up the computer system to run the OS: receive signals indicating whether the voltages have been applied successfully and/or a timing of the applied voltages.

10. The computer system of claim 1, wherein the CPLD is configured to transmit information corresponding to the voltages received by the second ADC to the first controller.

11. The computer system of claim 1, wherein the CPLD is configured to receive information corresponding to voltages applied to the second set of components in response to a number of voltages to be received by the first ADC reaches a maximum number.

12. The computer system of claim 1, wherein the first controller is further configured to:
enter, in response to a determination that an input signal is provided to the computer system within a predetermined amount of time, the computer system into a debug mode; and
load, in response to a determination that an input signal is not provided to the computer system within a predetermined amount of time, the OS.

13. A computer system, comprising:
a circuit board;
one or more components disposed on the circuit board;
a first controller that is on the circuit board and configured to, before booting up the computer system to run an operating system (OS):
receive information corresponding to parameters of the circuit board and/or the components;
determine whether the first controller is connected to a server; and
determine, in response to a determination that the first controller is not connected to a server, whether an input signal is provided to the computer system within a predetermined amount of time; and
a complex programmable logic device (CPLD) that is on the circuit board and configured to, before booting up the computer system to run the OS:
provide a first signal to enable at least some of the components;
receive information corresponding to a sequence of voltages applied to the enabled components; and
transmit the received information to the first controller;
wherein the first controller is a baseboard management controller (BMC) and includes a first analog-to-digital converter (ADC) configured to receive information corresponding to voltages applied to a first set of components; and
wherein the CPLD includes a second ADC configured to receive information corresponding to voltages applied to a second set of components, wherein the second ADC is capable of receiving more voltage levels than the first ADC.

14. The computer system of claim 13, wherein the parameters include a temperature of the components in the computer system, a speed of components in the computer system, alternating current/direct current (AC/DC) voltages or power status of the components in the computer system, OS status, timing and/or digital input signals.

15. The computer system of claim 13, further comprising a plurality of controllers connected to the first controller and the components, wherein the controllers are configured to detect information corresponding to parameters of the components, the circuit board and/or connectors/sockets, and to transmit detected information to the first controller.

16. The computer system of claim 13, wherein the first controller is configured to transmit the received information to a management server.

17. The computer system of claim 13, wherein the first controller is configured to receive the information at a u-boot stage.

18. The computer system of claim 13, wherein the first controller is further configured to:
enter, in response to a determination that an input signal is provided to the computer system within a predetermined amount of time, the computer system into a debug mode; and
load, in response to a determination that an input signal is not provided to the computer system within a predetermined amount of time, the OS.

19. A method for testing a computer system that comprises components, the method comprising:
(a) providing a direct current (DC) power to turn on the computer system;
(b) providing a first signal to enable at least some of the components of the computer system;
(c) receiving information corresponding to a sequence of voltages applied to the enabled components before booting up the computer system to run an operating system (OS), wherein the information is collected by a baseboard management controller (BMC) and a complex programmable logic device (CPLD) separate from each other;

(d) determining whether the BMC is connected to a server; and
(e) determining, in response to a determination that the BMC is not connected to a server, whether an input signal is provided to the computer system within a predetermined amount of time;

wherein the BMC includes a first analog-to-digital converter (ADC) configured to receive information corresponding to voltages applied to a first set of components; and wherein the CPLD includes a second ADC configured to receive information corresponding to voltages applied to a second set of components, wherein the second ADC is capable of receiving more voltage levels than the first ADC.

20. The method of claim 19, further comprising detecting parameters of the components of the computer system, wherein the parameters include a temperature of the components in the computer system, a speed of the components in the computer system, alternating current/direct current (AC/DC) voltages or power status of the components in the computer system, OS status, timing and/or digital input signals.

21. The method of claim 19, further comprising transmitting the collected information to a management server.

22. The method of claim 19, further comprising:
entering, in response to a determination that an input signal is provided to the computer system within a predetermined amount of time, the computer system into a debug mode; and
loading, in response to a determination that an input signal is not provided to the computer system within a predetermined amount of time, the OS.

* * * * *